Feb. 16, 1965   W. P. MOORE, JR., ET AL   3,169,993
CATALYTIC HYDROGENATION OF NITROSODIALKYLAMINES
Filed Aug. 17, 1959
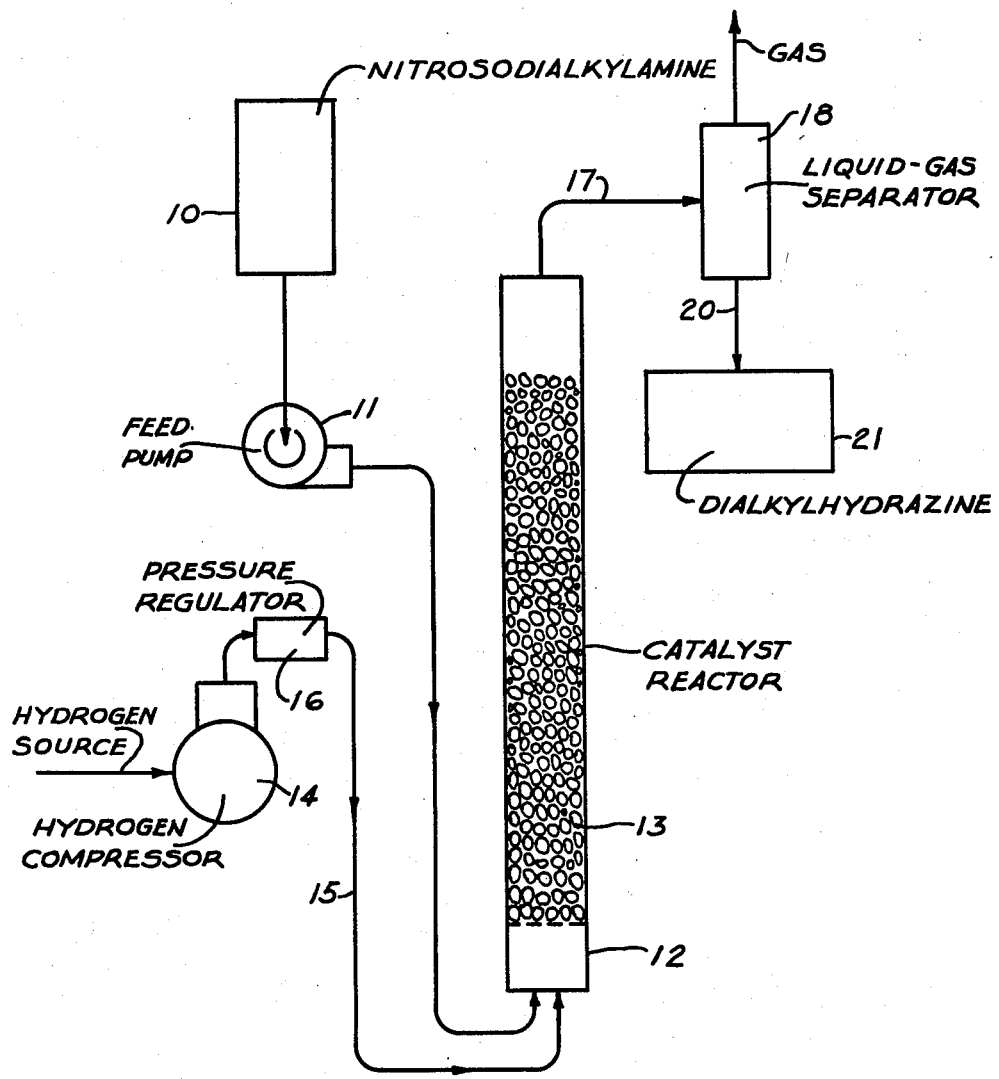
INVENTORS
William P. Moore, Jr.
Donald Pickens
BY
Benjamin Sweedler 3,169,993
CATALYTIC HYDROGENATION OF NITROSODIALKYLAMINES
William P. Moore, Jr., and Donald Pickens, Chester, Va., assignors to Allied Chemical Corporation, New York, N.Y., a corporation of New York
Filed Aug. 17, 1959, Ser. No. 834,309
8 Claims. (Cl. 260—583)

This invention relates to the production of unsymmetrical-dialkylhydrazines in which the alkyl groups each contain from 1 to 3 carbon atoms and specifically to the production of unsymmetrical-dimethylhydrazine, herein referred to for the sake of brevity as DMH. More particularly this invention relates to the catalytic hydrogenation of nitrosodimethylamine to produce DMH. While the invention will be hereinafter described, for the most part, in connection with the production of the preferred embodiment, DMH, it will be understood it is not limited thereto and includes the preparation of unsymmetrical-dialkylhydrazines such as diethyl-, dipropyl-, unsymmetrical-methylethyl-, and unsymmetrical-ethylpropylhydrazines.

DMH is used as a special fuel in the guided missile and rocket fields. It has been proposed to prepare DMH by reducing nitrosodimethylamine employing platinum and palladium catalysts on high specific surface area supports (above at least 15 square meters per gram) such as carbon, alumina, silica, silica-alumina or titania (British Patent 797,483). According to this British patent, catalytic materials having specific surface areas of less than 15 square meters per gram are inoperable to effect satisfactory hydrogenation of nitrosodialkylamines including nitrosodimethylamine to dialkylhydrazines.

It is among the objects of the present invention to provide a catalytic process of hydrogenating nitrosodialkylamines having from 1 to 3 carbon atoms in the alkyl groups, particularly nitrosodimethylamine, in which the catalyst has a long life and this without appreciable loss of efficiency.

It is another object of this invention to provide such catalytic process in which the production of byproducts such as ammonia and dialkylamines are minimized.

It is still another object of this invention to provide such catalytic process which overcomes the objections of prior known procedures in which the catalysts lose their efficiency and produce increasing amounts of byproducts with the passage of time, i.e. with age.

Other objects and advantages of this invention will be apparent from the following detailed description thereof.

In accordance with the present invention, nitrosodialkylamines, particularly nitrosodimethylamine, are hydrogenated to produce unsymmetrical-dialkylhydrazines, particularly DMH, by passing the nitrosodialkylamines in the liquid phase and hydrogen through a fixed catalyst bed containing as the catalyst either platinum or palladium on an alpha alumina or periclase or mixture of alpha alumina and periclase carrier or support while maintaining the catalyst bed under superatmospheric pressure and at a temperature within the range of 30° C. to 75° C.

Surprisingly, it has been found that by observing these conditions the catalyst retains its activity and efficiency for long periods of time of the order of several days and longer; with this invention little or no increase in the amount of byproducts formed takes place with age.

Alpha alumina and periclase have low surface areas, not greater than 10 square meters per gram, i.e. have little internal pore surfaces. The specific surface area of alpha alumina is approximately 6 square meters per gram, that of periclase is approximately 10 square meters per gram. This compares with 150 square meters per gram, the specific surface area of gamma alumina, and about 1,200 square meters per gram, the specific surface area of charcoal. The above values for surface areas were determined by the adsorption isotherm method of Brunauer, Emmett and Teller, J. Amer. Chem. Soc. 60, 309 (1938).

The alpha alumina used is the ordinary crystalline variety of alumina represented by corundum. Periclase is a mineral consisting chiefly of magnesium oxide which crystallizes in the cubic system and has a specific gravity of from 3.64 to 3.90. Both alpha alumina and periclase are readily available commercially.

In the preparation of the catalyst, the alpha alumina, periclase or mixture, if not already of the desired particle size within the range of from 4 to 50 mesh (U.S. screen size) is first reduced to this size and then coated with platinum or palladium in any suitable manner to provide a supported catalyst containing from 0.5% to 2% by weight of the metal on the carrier particles. For example, a platinum salt such as platinic chloride may be deposited on the alpha alumina or periclase particles, treated with sodium hydroxide and the platinum oxide thus formed reduced to platinum. Alternatively, platinum or palladium may be directly deposited on the carrier particles of alpha alumina or periclase.

The catalyst particles thus prepared are disposed in a fixed bed, the dimensions of which will, of course, depend on the capacity of the equipment. Through this bed is passed the dialkylnitrosoamine in the liquid phase and hydrogen under pressure while maintaining a temperature of from 30° C. to 75° C. in the bed. Such temperature is readily maintained by introducing the reactants at a temperature within this range close to or at the desired operating temperature. The reactants are introduced under superatmospheric pressure within the range of 500 to 3,000 p.s.i.g. to maintain the desired superatmospheric pressure conditions in the catalyst bed. The velocity of the liquid dialkylnitrosoamine desirably is from 0.2 to 1 volume per volume of catalyst in the bed per hour.

Preferred operations involve the feed of a water solution of dimethylnitrosoamine containing from 10 to 60 weight percent dimethylnitrosoamine and 40% to 90% water. Instead of water, other solvents for the dialkylnitrosoamine may be used, such, for example, as acetic acid, ethyl alcohol, ethylene glycol, mixtures of any of these solvents with water and mixtures of such solvents with or without water. While it is preferred to use a solvent system, the invention is not limited thereto but the nitrosoamine in the liquid phase may be passed through the catalyst bed.

The amount of hydrogen passed through the catalyst bed is in excess of the stoichiometric amount required for the reduction. The amount of excess is not critical. Unreacted hydrogen, after separation from the dialkylhydrazine, for reasons of economy, may be recycled through the catalyst reactor.

In the accompanying drawing, the single figure shows, for purposes of exemplification and to facilitate a better understanding of this invention, a flow sheet of a preferred arrangement of equipment for carrying out the process of this invention.

In this figure, 10 indicates a feed tank containing the solution of nitrosodialkylamine and communicating with the pump 11 for pumping this solution under desired pressure into catalyst reactor 12 containing the fixed bed of catalyst 13. Hydrogen from any suitable source is supplied to the hydrogen compressor 14, from which hydrogen flows through line 15 containing pressure regulator 16 into the base of the catalyst reactor 12. The hydrogen and liquid nitrosodialkyamine flow cocurrently up through the bed of catalyst 13. The reaction products exit from the top of this reactor through line 17 which leads into a liquid-gas separator 18. From this separator 18 the gases consisting chiefly of hydrogen may be recycled through the reactor, if desired. The reaction product consisting of crude unsymmetrical dialkylhydrazine is removed from the separator 18 through line 20 leading into the storage tank 21.

Reactor 12 may be of stainless steel or other material resistant to corrosion by the reactants and the reaction products. The storage tank 21 may be of aluminum, mild steel or glass. It will, of course, be appreciated that any desired materials of construction resistant to corrosion by the reactants and reaction products may be used.

The following examples are illustrative of the process of this invention. It will be appreciated that this invention is not limited to these examples. In the examples, parts and percentages are on a weight basis, temperatures in ° C. The examples were carried out in equipment of the type shown in the drawing.

EXAMPLE I

This example involved the use of a catalyst containing 0.5% platinum on periclase particles having an average diameter of about ⅛ inch and a specific surface area of 10 square meters per gram. The bed of catalyst in the hydrogenation reactor contained 450 ml. of the catalyst and was operated at 31° and 2,000 p.s.i.g. A solution containing 25% dimethylnitrosoamine and 75% water was pumped at a rate of 0.21 volume per volume of catalyst per hour and the hydrogen rate was 150 volumes (measured at normal temperature and pressure) per volume of catalyst per hour.

Attack on the dimethylnitrosoamine was 98% complete. The efficiency of the hydrogenation to DMH was 94%.

The catalyst converter was operated for 211 hours under the conditions described above and thereafter the catalyst was reevaluated. Its efficiency upon reevaluation in converting the nitrosodimethylamine to DMH was still 94%.

EXAMPLE II

This example involved a catalyst which differed from that used in Example I in that the carrier or support was alpha alumina having a specific surface area of 6 square meters per gram and containing 0.5% by weight of platinum on the alpha alumina particles having an average diameter of ⅛ inch.

The catalyst converter was operated at a temperature of 60° C. and under a pressure of 2,000 p.s.i.g. A solution containing 24% dimethylnitrosoamine and 76% water was pumped at a rate of 0.27 volume per volume of catalyst per hour. The hydrogen flow rate was the same as in Example I.

Attack on the dimethylnitrosoamine was 90%. The efficiency of the hydrogenation reaction to DMH was 82%.

The reaction was continued for 40 hours under the conditions noted and the catalyst was then reevaluated. Upon reevaluation, the efficiency of the reaction to DMH was 83%.

In both Examples I and II there was no increase in byproduct formation throughout the initial runs and upon reevaluation of the catalyst.

For comparative purposes, there was carried out a run under substantially the same conditions as in Example I except that the carrier for the catalyst was a gamma alumina having a specific surface area of 160 square meters per gram. In this comparative run, the gamma alumina was coated with platinum using the same relative amount as in the catalyst of Example I (0.5%). The catalyst converter was operated at 60° C. under 2,000 p.s.i.g. A water solution of dimethylnitrosoamine was used of the same concentration as that in Example I, pumped at a rate of 0.34 volume per volume of catalyst per hour. The hydrogenation feed rate was substantially the same as in Example I. Attack on the dimethylnitrosoamine was 78% and the efficiency of the reaction to DMH was 86%. This comparative test was continued for 66 hours and the catalyst then reevaluated. Upon reevaluation, its efficiency was found to be 80%, a drop of 6% in 66 hours; the amount of byproducts (ammonia and dimethylamines) increased with passage of time.

Table I below gives the percentage decrease in reaction efficiencies with time, based on comparative runs of producing DMH from dimethylnitrosoamine, of 100 hours duration involving fixed beds of the catalyst identified in the table. This table shows that the present invention, involving the use of fixed beds of platinum or palladium on periclase or alpha alumina supports, does not result in appreciable loss of efficiency with time, whereas using high specific surface area supports, such as charcoal and gamma alumina, appreciable loss of efficiency takes place with time.

*Table 1*

| Catalyst | Specific Surface Area, M²/Gram | Decrease in Reaction Efficiency with Time, Percent/ 100 hours |
| --- | --- | --- |
| 2.0% Pt on Charcoal, 4-8 mesh | 1,200 | 11.3 |
| 0.5% Pt on Gamma Alumina, ⅛″ dia | 150 | 11.4 |
| 0.5% Pd on Gamma Alumina, ⅛″ dia | 150 | 18.8 |
| 0.5% Pt on Periclase (4-8 mesh) | 10 | 1.0 |
| 0.5% Pt on Alpha Alumina, ⅛″ dia | 6 | 0.0 |

It will be noted the present invention provides a process for synthesizing dialkylhydrazines, particularly DMH, using a fixed bed catalyst in which the conversion of dialkylnitrosoamine to the corresponding dialkylhydrazine, particularly dimethylnitrsoamine to DMH, is efficient over long periods of time without the concurrent production of significant amounts of byproducts (dimethylamine and ammonia).

The unexpectedly long life with no appreciable decrease in efficiency of the supported catalyst employed in the process of this invention is believed to be due to the low surface area of alpha alumina and periclase, and to the unexpected phenomena that alpha alumina and periclase, unlike other low surface area supports (e.g. calcium carbonate), do not appear to have any deleterious affect on the activity of the catalyst metal. Catalysts with appreciable internal pore surfaces (having a specific surface area greater than 10 square meters per gram) allow the reactants dimethylnitrosoamine and hydrogen to enter the internal pore structure of the catalyst. The rate of liquid diffusion through the pore structure of the catalyst is slow so that the material entering the pore structure is held on the catalyst surfaces for much longer periods of time than the reactants which react on the superficial surfaces. As a result of this effect the dimethylnitrosoamine reaching the internal pore structure is not only converted to dimethylhydrazine but the dimethylhydrazine to a large extent is further reacted to dimethylamine and ammonia in accordance with the equation:

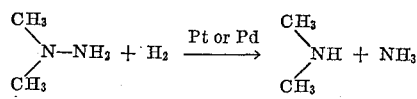

Gamma alumina and other high surface forms of alumina change structure and become deactivated as a result of prolonged operation in dimethylhydrazine and dimethylnitrosoamine. On the other hand, prolonged use of the low surface area alpha alumina supported catalysts in dimethylhydrazine synthesis does not cause appreciable physical or chemical changes in the catalyst, as in the case, for example, of activated alumina supported catalyst where the tri- and mono-hydrates of alumina are formed in appreciable amounts as a result of continued operation. Similarly periclase supported catalysts do not change structure over long periods of operation and maintain a high efficiency for converting dimethylnitrosoamine to dimethylhydrazine with a minimum production of ammonia and dimethylamine. Alpha alumina and periclase have little tendency to adsorb and polymerize impurities present in the dimethylnitrosoamine feed, such, for example, as methylene dimethylhydrazine. These impurities polymerize in the active pores of high surface catalysts, such, for example, as activated alumina and gamma alumina and the polymers thus formed cover the active catalyst metal, thus causing catalyst deactivation.

It will be appreciated that the above explanation is given to facilitate a better understanding of the invention and this invention is not to be limited thereto.

It is to be understood that this invention is not restricted to the present disclosure otherwise than as defined by the appended claims.

What is claimed is:

1. The process of hydrogenating nitrosodialkylamines to produce unsymmetrical-dialkylhydrazines, in which the alkyl groups contain from 1 to 3 carbon atoms, which process comprises passing the nitrosodialkylamine in the liquid phase and hydrogen through a bed of catalyst particles consisting essentially of a metal from the group consisting of platinum and palladium on a carrier from the group consisting of alpha alumina and periclase, while maintaining the catalyst bed under superatmospheric pressure within the range of from 500 to 3000 p.s.i.g. and at a temperature within the range of 30° C. to 75° C.

2. The process of hydrogenating nitrosodimethylamine to produce unsymmetrical-dimethylhydrazine, which process comprises passing nitrosodimethylamine and hydrogen through a bed of catalyst particles consisting essentially of a metal from the group consisting of platinum and palladium on a carrier from the group consisting of alpha alumina and periclase, while maintaining the catalyst bed under superatmospheric pressure within the range of from 500 to 3000 p.s.i.g. and at a temperature within the range of 30° C. to 75° C.

3. The process of hydrogenating nitrosodimethylamine to produce unsymmetrical-dimethylhydrazine, which process comprises passing hydrogen and an aqueous solution of dimethylnitrosoamine through a fixed bed of catalyst particles consisting essentially of a metal from the group consisting of platinum and palladium on a carrier from the group consisting of alpha alumina and periclase, while maintaining the catalyst bed under a pressure within the range of from 500 to 3,000 p.s.i.g. and at a temperature of from 30° C. to 75° C.

4. The process of hydrogenating nitrosodimethylamine to produce unsymmetrical-dimethylhydrazine, which process comprises passing an aqueous solution of dimethylnitrosoamine consisting essentially of from 10 to 60 weight percent dimethylnitrosoamine and 40% to 90% water and hydrogen through a fixed bed of catalyst consisting of platinum on an alpha alumina carrier having a particle size of from 4 to 50 mesh, the amount of platinum on the carrier particles being from 0.5% to 2% by weight, while maintaining said catalyst bed under a pressure of from 500 to 3,000 p.s.i.g. and at a temperature of from 30° C. to 75° C.

5. The process as defined in claim 4, in which the aqueous solution of dimethylnitrosoamine is passed through the fixed catalyst bed at a space velocity of from 0.2 to 1 volume per volume of catalyst per hour.

6. The process of hydrogenating nitrosodimethylamine to produce unsymmetrical-dimethylhydrazine, which process comprises passing an aqueous solution of dimethylnitrosoamine consisting essentially of from 10 to 60 weight percent dimethylnitrosoamine and 40% to 90% water and hydrogen through a fixed bed of catalyst consisting of palladium on an alpha alumina carrier having a particle size of from 4 to 50 mesh, the amount of palladium on the carrier particles being from 0.5% to 2% by weight, while maintaining said catalyst bed under a pressure of from 500 to 3,000 p.s.i.g. and at a temperature of from 30° C. to 75° C.

7. The process of hydrogenating nitrosodimethylamine to produce unsymmetrical-dimethylhydrazine, which process comprises passing an aqueous solution of dimethylnitrosoamine consisting essentially of from 10 to 60 weight percent dimethylnitrosoamine and 40% to 90% water and hydrogen through a fixed bed of catalyst consisting of platinum on a periclase carrier having a particle size of from 4 to 50 mesh, the amount of platinum on the carrier particles being from 0.5% to 2% by weight, while maintaining said catalyst bed under a pressure of from 500 to 3,000 p.s.i.g. and at a temperature of from 30° C. to 75° C.

8. The process of hydrogenating nitrosodimethylamine to produce unsymmetrical-dimethylhydrazine, which process comprises passing an aqueous solution of dimethylnitrosoamine consisting essentially of from 10 to 60 weight percent dimethylnitrosoamine and 40% to 90% water and hydrogen through a fixed bed of catalyst consisting of palladium on a periclase carrier having a particle size of from 4 to 50 mesh, the amount of palladium on the carrier particles being from 0.5% to 2% by weight, while maintaining said catalyst bed under a pressure of from 500 to 3,000 p.s.i.g. and at a temperature of from 30° C. to 75° C.

References Cited in the file of this patent

UNITED STATES PATENTS

| 2,768,878 | Passino | Oct. 30, 1956 |
| 2,885,442 | McCulloch et al. | May 5, 1959 |

FOREIGN PATENTS

| 1,160,629 | France | Mar. 3, 1958 |
| 797,483 | Great Britain | July 2, 1958 |